(12) United States Patent  
Matsubara

(10) Patent No.: US 8,228,312 B2
(45) Date of Patent: Jul. 24, 2012

(54) POSITION DETECTING DEVICE

(75) Inventor: Masaki Matsubara, Meguro-ku (JP)

(73) Assignee: Wacom, Co., Ltd., Saitama (JP)

( * ) Notice: Subject to any disclaimer, the term of this patent is extended or adjusted under 35 U.S.C. 154(b) by 877 days.

(21) Appl. No.: 12/345,582

(22) Filed: Dec. 29, 2008

(65) Prior Publication Data

US 2009/0166100 A1     Jul. 2, 2009

(30) Foreign Application Priority Data

Dec. 28, 2007   (JP) .................. 2007-340099

(51) Int. Cl.
*G09G 5/00* (2006.01)
(52) U.S. Cl. .............. 345/174; 178/18.06; 178/18.07
(58) Field of Classification Search .......... 345/173, 345/174; 178/18.03, 18.06, 18.07
See application file for complete search history.

(56) References Cited

U.S. PATENT DOCUMENTS

| | | | |
|---|---|---|---|
| 4,733,222 A | 3/1988 | Evans | |
| 5,463,388 A | 10/1995 | Boie | |
| 5,717,435 A | 2/1998 | Fukushima et al. | |
| 6,297,811 B1 * | 10/2001 | Kent et al. | 345/173 |
| 7,019,765 B2 * | 3/2006 | Fujiwara et al. | 347/173 |
| 2007/0103607 A1 | 5/2007 | Hanaoka | |

FOREIGN PATENT DOCUMENTS

| | | |
|---|---|---|
| DE | 20 2007 007 345 U1 | 12/2007 |
| GB | 2439614 A | 1/2008 |
| JP | 7302153 A | 11/1995 |
| JP | 2006330638 A | 12/2006 |
| WO | 2007/129085 A2 | 11/2007 |

OTHER PUBLICATIONS

European Search Report dated Apr. 15, 2009, issued in corresponding Application No. EP 08022437, filed Dec. 23, 2008.

* cited by examiner

*Primary Examiner* — Regina Liang
(74) *Attorney, Agent, or Firm* — Seed IP Law Group PLLC

(57) ABSTRACT

A position detecting device includes a position indicator (2), a first detection section (13) (e.g., an electrostatic capacity type detection section) having a substantially flat shape, and a second detection section (14) (e.g., an electromagnetic induction type detection section). The position indicator (2) has a coil (27). The first detection section (13) has, on one surface thereof, detection electrodes (15) for detecting a capacitance between itself and a human body part. The second detection section (14) is provided with loop coils (24) for detecting a magnetic flux G. Further, each of the detection electrodes (15) has a substantially flat shape, and is provided with at least one slit (19) extending from the outer edge to the inside. With such a configuration, not only can degradation of detection accuracy of the first detection section be prevented or suppressed, but also degradation of detection accuracy of the second detection section can be prevented or suppressed.

15 Claims, 10 Drawing Sheets

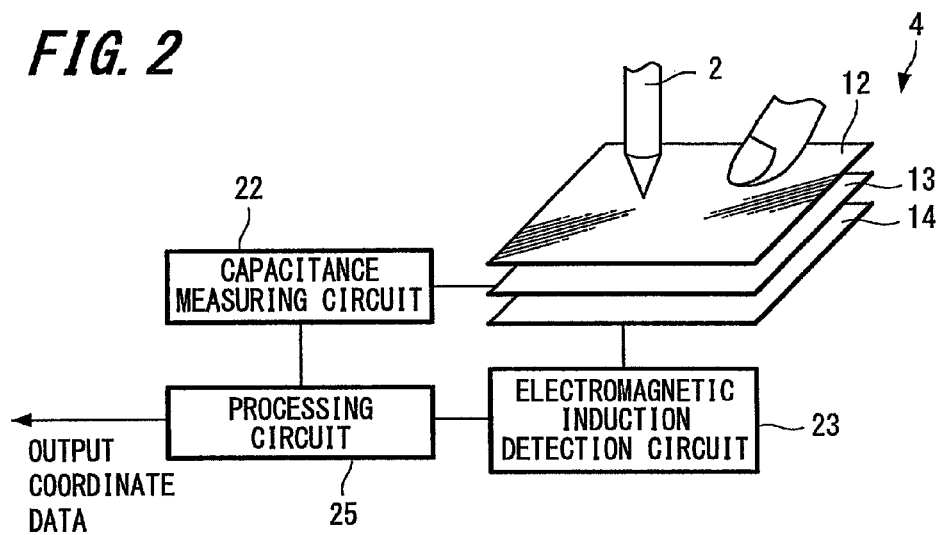
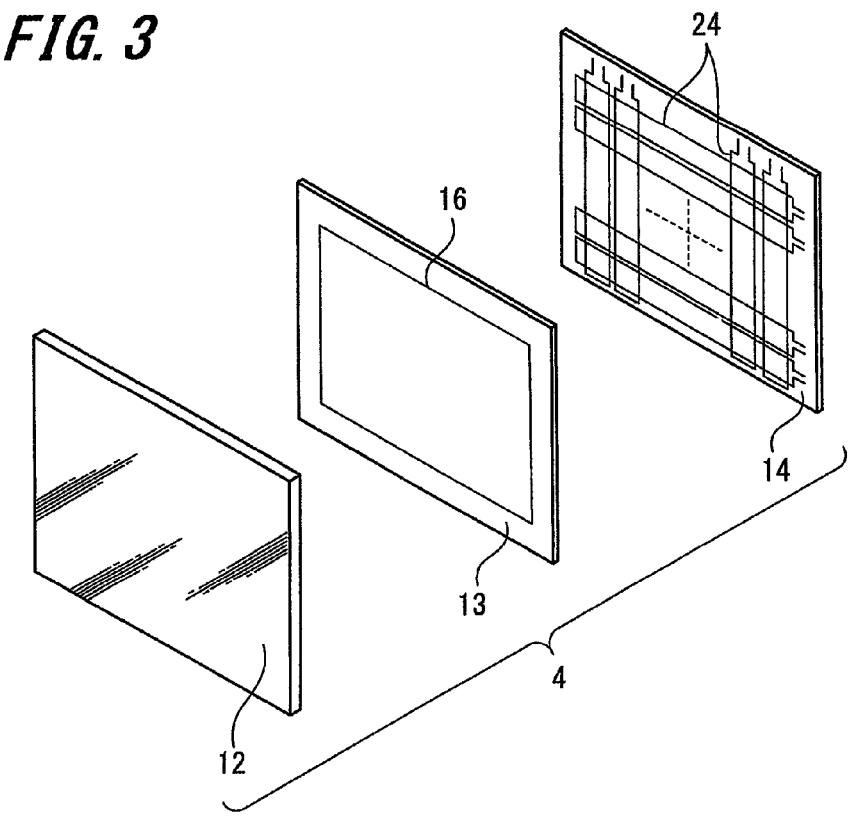

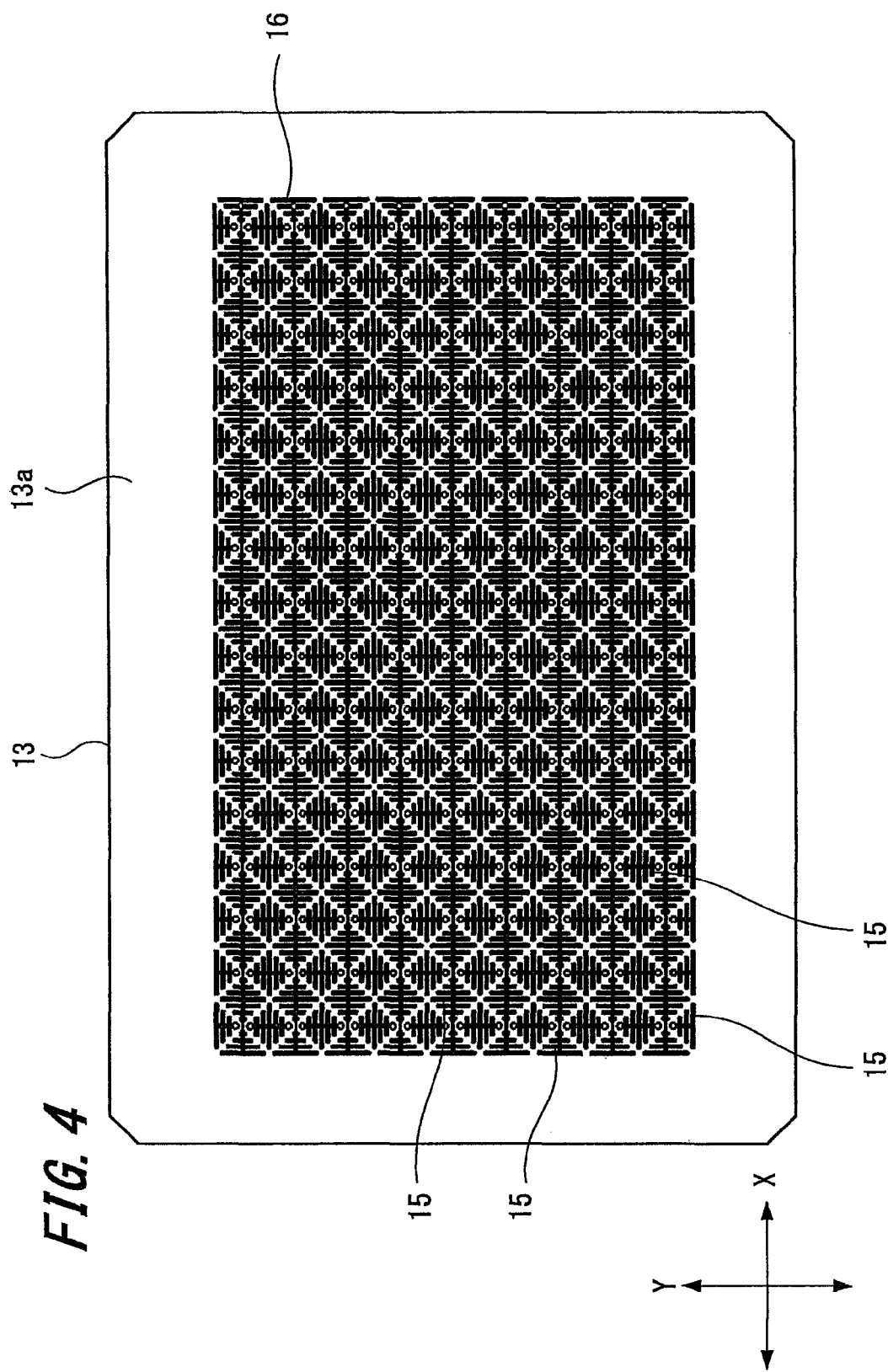

POSITION DETECTING DEVICE

CROSS REFERENCES TO RELATED APPLICATIONS

The present application claims priority under 35 U.S.C. §119 from Japanese Patent Application JP 2007-340099 filed in the Japanese Patent Office on Dec. 28, 2007, the entire contents of which are incorporated herein by reference.

BACKGROUND OF THE INVENTION

1. Field of the Invention

The present invention relates to a position detecting device in which an electrostatic capacity type detection section and an electromagnetic induction type detection section are superimposed on each other, so that a position indicated by either a position indicator or a human body part (e.g., a finger) can be detected.

2. Description of the Related Art

Conventionally, a position detecting device has been used as a device for performing position input in an information-processing device such as a personal computer. In such a position detecting device, a pointing operation or a handwriting input operation such as handwriting a character or hand-drawing an illustration is performed with an input tool such as a pen-like position indicator or a human body part (e.g., a finger).

Input operation using the position indicator as the input tool is performed based on, for example, an electromagnetic resonance technology, in which the position indicator is provided with a resonant circuit that resonates with an electromagnetic wave of a specified frequency transmitted from the position detecting device. Further, a resonance signal induced in the resonant circuit is transmitted to the position detecting device, so that the position indicator indicates its own position to the position detecting device (see, for example, Japanese Unexamined Patent Application Publication No. 7-302153).

Further, input operation using parts of the human body as the input tool is performed based on, for example, an electrostatic capacity technology shown in FIG. 12. FIG. 12 is a view schematically showing an electrostatic capacity type detection section 200. The detection section 200 includes a flat plate-shaped detection electrode 201 and a capacitance measuring circuit 202. When the human body part approaches or contacts with the detection electrode 201, a capacitance is generated between the human body part and the detection electrode 201. The position that the human body part approaches or contacts with is detected as the position of the detection electrode 201 whose capacitance changes due to the change of the capacitance between the human body part and the detection electrode 201. The higher the capacitance between the human body part and the detection electrode 201, the easier the capacitance can be detected. Thus, a flat electrode having an area at or above a predetermined size is used as the detection electrode 201.

In general, since the electromagnetic induction type detection section has high position detecting accuracy compared to the electrostatic capacity type detection section, the electromagnetic induction type detection section is used in a computer, for example, for performing fine input operation such as handwriting a character or hand-drawing an illustration. In contrast, although the electrostatic capacity type detection section has low position detecting accuracy compared to the electromagnetic induction type detection section, it can detect an input operation performed by the human body part. Therefore, an electrostatic capacity type detection section is used in a device such as an automated teller machine (ATM), a cell-phone or the like, in which input operation is performed by directly touching a screen of the device. A newer type of position detecting device has been proposed in which both the electromagnetic induction type detection section and the electrostatic capacity type detection section are effectively utilized.

SUMMARY OF THE INVENTION

There has been proposed a position detecting device in which both the electromagnetic induction type detecting method and electrostatic capacity type detecting method can be used in a common input area. In such a position detecting device, by superimposing an electromagnetic induction type detection section and an electrostatic capacity type detection section onto one another, two different input methods can be performed in the common input area without increasing the size of the device.

FIG. 13 is a view schematically showing a position detecting device, in which a detection electrode 201 that constitutes the electrostatic capacity type detection section is disposed above loop coils 304 that constitute the electromagnetic induction type detection section.

In such a position detecting device, a magnetic flux G generated by a coil 27 of a position indicator 2 is perpendicular to the detection electrode 201 of the electrostatic capacity type detection section. Thus, the magnetic flux G generates an eddy current I in the detection electrode 201. The eddy current I in the detection electrode 201 generates a new magnetic flux which has a direction so as to attenuate the magnetic flux G generated by the position indicator 2 (i.e., the direction of the new magnetic flux is opposite to the direction of the magnetic flux G). Since the new magnetic flux attenuates the magnetic flux G from the position indicator 2, detection of the magnetic flux G by the electromagnetic induction type detection section is reduced. As a result, detection accuracy is lowered.

Similarly, when a magnetic flux is generated by the loop coils 304, an eddy current will be generated in the detection electrode 201. Thus, the magnetic flux reaching the position indicator 2 is reduced. As a result, sufficient induced electromotive force cannot be obtained in the resonant circuit of the position indicator 2.

To solve this problem, it has been proposed that the area of the detection electrode be reduced so as to reduce the eddy current generated in the detection electrode. However, if the area of the detection electrode is reduced, the detection accuracy of the electrostatic capacity type detection section will be degraded since the capacitance between a human body part (e.g., a finger) and the detection electrode becomes small.

In view of the aforesaid problems, it is an object of the present invention to provide a position detecting device where not only the degradation of the detection accuracy of the first detection section (e.g., an electrostatic capacity type detection section) can be prevented or suppressed, but also the degradation of the detection accuracy of the second detection section (e.g., an electromagnetic induction type detection section) can be prevented or suppressed.

A position detecting device according to one embodiment of the present invention includes: a position indicator having at least one coil and adapted to generate a magnetic flux from the coil; a substantially flat first detection section having at least one detection electrode arranged on one surface thereof, the detection electrode being adapted to detect a capacitance between itself and a human body part; and a second detection section disposed on the side of the other surface opposite to the one surface of the first detection section and provided with at least one loop coil for detecting the magnetic flux. In such a position detecting device, the detection electrode is formed substantially flat and is provided with at least one slit extending from an outer edge to an inner side thereof.

With the position detecting device according to the present embodiment, by forming at least one slit in the detection electrode of the first detection section (an electrostatic capacity type detection section), the eddy current generated in the detection electrode can be prevented or suppressed. Thereby the degradation of the detection accuracy of the second detection section (an electromagnetic induction type detection section) can be prevented or suppressed.

BRIEF DESCRIPTION OF THE DRAWINGS

FIG. 2 is a block diagram showing a configuration of the position detecting device according to the aforesaid embodiment;

FIG. 3 is an exploded perspective view showing an input section of the position detecting device according to the aforesaid embodiment;

FIG. 4 is a plan view showing a first detection section of the position detecting device according to the aforesaid embodiment when seen from one face of the first detection section;

FIGS. 5A and 5B show detection electrode groups of the position detecting device according to the aforesaid embodiment, wherein FIG. 5A is a plan view of a first detection electrode group, and FIG. 5B is a plan view of a second detection electrode group;

DETAILED DESCRIPTION OF THE PREFERRED EMBODIMENT(S)

Embodiments of a position detecting device according to the present invention will be described below with reference to FIGS. 1 to 11. In the attached drawings, like components are denoted by like numerals. While illustrative embodiments will be illustrated and described, it will be appreciated that various changes can be made therein.

Figure 1:
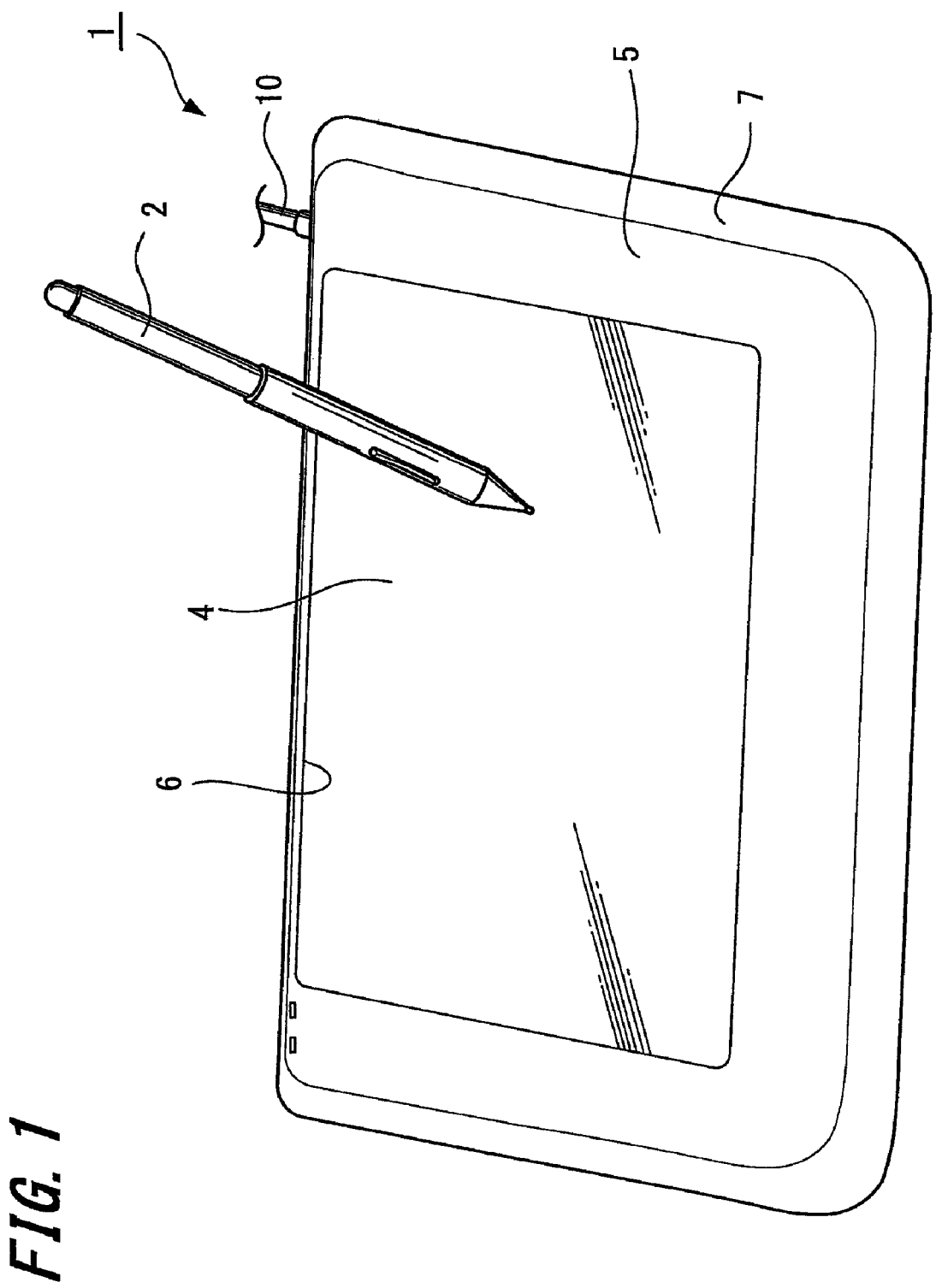
FIG. 1 is a perspective view showing a position detecting device according to one embodiment of the present invention.

Firstly, a configuration of a position detecting device 1 according to one embodiment of the present invention will be described below with reference to FIG. 1. As shown in FIG. 1, the position detecting device 1 is connected to an external device (not shown) such as a personal computer, a PDA (Personal Digital Assistant) or the like through a cable 10. In such a manner, the position detecting device 1 is used as an input device of the external device. Note that, although not shown in the drawings, the position detecting device 1 may also be incorporated into a personal computer or the like.

Referring additionally to FIG. 4, the position detecting device 1 includes a first detection section 13, such as an electrostatic capacity type detection section, and a second detection section 14, such as an electromagnetic induction type detection section, which will be described later. Further, a pointing operation or handwriting input operation such as handwriting character or illustration can be performed on the position detecting device 1 with a position indicator 2 or by a human body part (e.g., a finger).

The position indicator 2 indicates its own position to the position detecting device 1 based on electromagnetic resonance technology. The position indicator 2 includes a resonant circuit configured with a coil and a capacitor, the resonant circuit resonating with an electromagnetic wave of a specified frequency transmitted from the position detecting device 1. A resonance signal induced in the resonant circuit is transmitted to the position detecting device 1, so that the position indicator 2 indicates its own position to the position detecting device 1.

The position detecting device 1 includes an input section 4 to which information is inputted, and a thin rectangular parallelepiped-shaped housing 5 with the input section 4 fitted therein. The housing 5 includes an upper housing 7 having a quadrangular shaped opening 6 formed therein for exposing an input surface of the input section 4, and a lower housing (not shown) coupled with the upper housing 7. The input section 4 is fitted into the opening 6.

Next, a circuit configuration of the position detecting device according to the present embodiment will be described below with reference to FIG. 2. The position detecting device 1 includes the input section 4, a capacitance measuring circuit 22, an electromagnetic induction detection circuit 23, and a processing circuit 25. The input section 4 includes an insulating cover 12, the first detection section 13, such as an electrostatic capacity type detection section, and the second detection section 14, such as an electromagnetic induction type detection section. The first detection section 13 is adapted to detect an approach or contact of the human body part or the like so as to detect the coordinates of a point where the human body part or the like approaches or contacts with the input section 4. The second detection section 14 is adapted to detect the coordinates of an approach or contact by the position indicator 2 on the input section 4.

The capacitance measuring circuit 22 is adapted to measure the change of the capacitance of detection electrodes provided in the first detection section 13, and is connected to the first detection section 13 and the processing circuit 25. The electromagnetic induction detection circuit 23 is adapted to detect the position (for example, by coordinates) of the point indicated by the position indicator 2, and is connected to the second detection section 14 and the processing circuit 25. The processing circuit 25 is adapted to calculate coordinate data of the point indicated by the human body part or the position indicator 2 and detected by the capacitance measuring circuit 22 or electromagnetic induction detection circuit

23. The processing circuit 25 outputs the calculated coordinate data to an external device (not shown) such as a personal computer or a PDA, or to a central processing unit (CPU) of a personal computer or the like. It will be recognized that the position detecting device 1 may be incorporated in the personal computer or the PDA, or the like.

Next, a configuration of the input section 4 of the position detecting device 1 according to the present embodiment will be described below with reference to FIG. 3. The input section 4 is formed in a thin flat shape. The input section 4 is configured with the insulating cover 12, the first detection section 13 having a substantially rectangular detection area 16 arranged on one surface thereof, and the second detection section 14 provided with a plurality of loop coils 24. Further, in the input section 4, the cover 12 and the first detection section 13 are arranged so that one surface of the cover 12 faces the one surface of the first detection section 13. The second detection section 14 is arranged so as to face the other surface of the first detection section 13. Thus, in the input section 4, the cover 12, the first detection section 13 and the second detection section 14 are superimposed on each other.

Next, a configuration of the first detection section 13 of the position detecting device 1 according to the present embodiment will be described below with reference to FIGS. 4 to 7. The first detection section 13 is configured with a substantially rectangular substrate 13a, and the substantially rectangular detection area 16 formed in substantially the central portion of one surface (referred to as the "front surface" hereinafter) of the substrate 13a. The detection area 16 is adapted to detect an approach or contact of the human body part or the like so as to detect the coordinates of a point where the human body part or the like approaches or contacts with the input section 4. The detection area 16 is configured with a plurality of detection electrodes 15. Among the plurality of detection electrodes 15 configuring the detection area 16, the detection electrodes 15 arranged in an outer peripheral portion of the detection area 16 are each formed in a substantially triangular shape, and the detection electrodes 15 arranged in an inner portion of the detection area 16 are each formed in a substantially quadrangular shape.

Next, the details of the detection area 16 will be described below with reference to FIGS. 5A, 5B, and 6. The detection area 16 is configured with a first detection electrode group 16A and a second detection electrode group 16B.

The first detection electrode group 16A is configured with a plurality of first detection electrode arrays 15a arranged in parallel with a short-side direction (referred to as Y-axis direction hereinafter) of the substrate 13a, each first detection electrode array 15a being formed by connecting a plurality of detection electrodes 15 at a predetermined interval. The first detection electrode group 16A is formed by arranging the plurality of first detection electrode arrays 15a in a long-side direction (referred to as X-axis direction hereinafter) perpendicular to the Y-axis direction of the substrate 13a at a predetermined interval. In each of the first detection electrode arrays 15a, the detection electrodes 15 adjacent in the Y-axis direction are electrically connected to each other by connecting the respective vertexes thereof with connecting portions 18a.

Similarly, the second detection electrode group 16B is configured with a plurality of second detection electrode arrays 15b arranged in the X-axis direction of the substrate 13a, each second detection electrode array 15b being formed by connecting a plurality of detection electrodes 15 at a predetermined interval. The second detection electrode group 16B is formed by arranging the plurality of second detection electrode arrays 15b in the Y-axis direction of the substrate 13a at a predetermined interval. In each of the second detection electrode arrays 15b, the detection electrodes 15 adjacent in the X-axis direction are electrically connected to each other by connecting the respective vertexes thereof with connecting portions 18b.

Figure 5A:
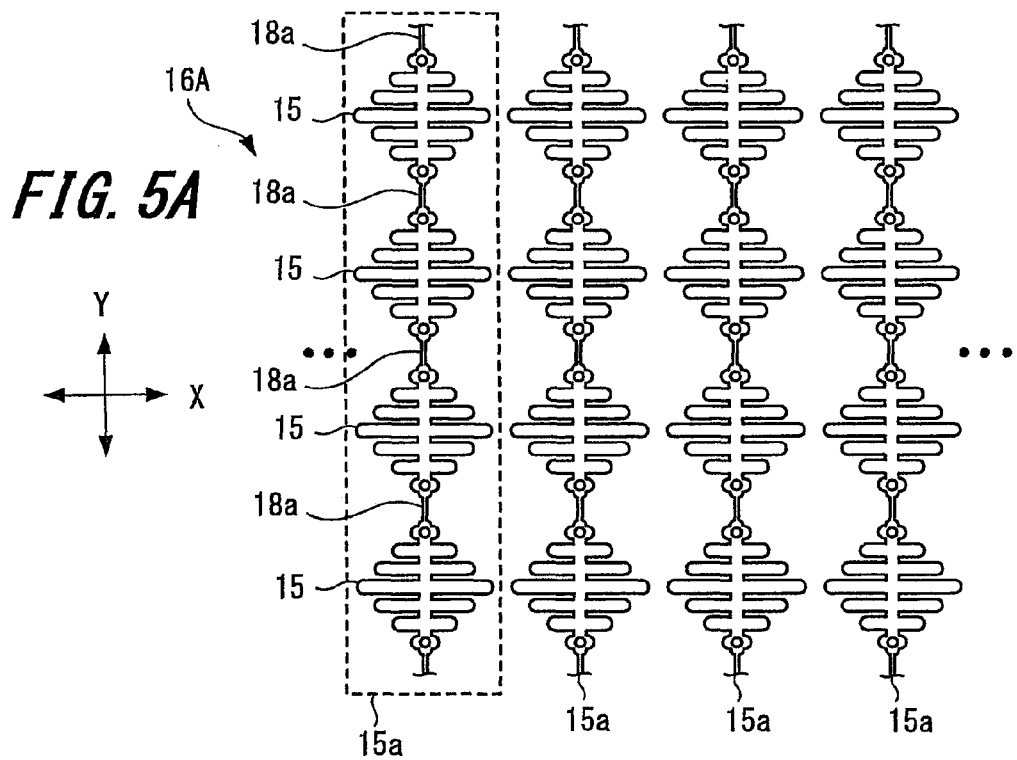
Figure 5B:
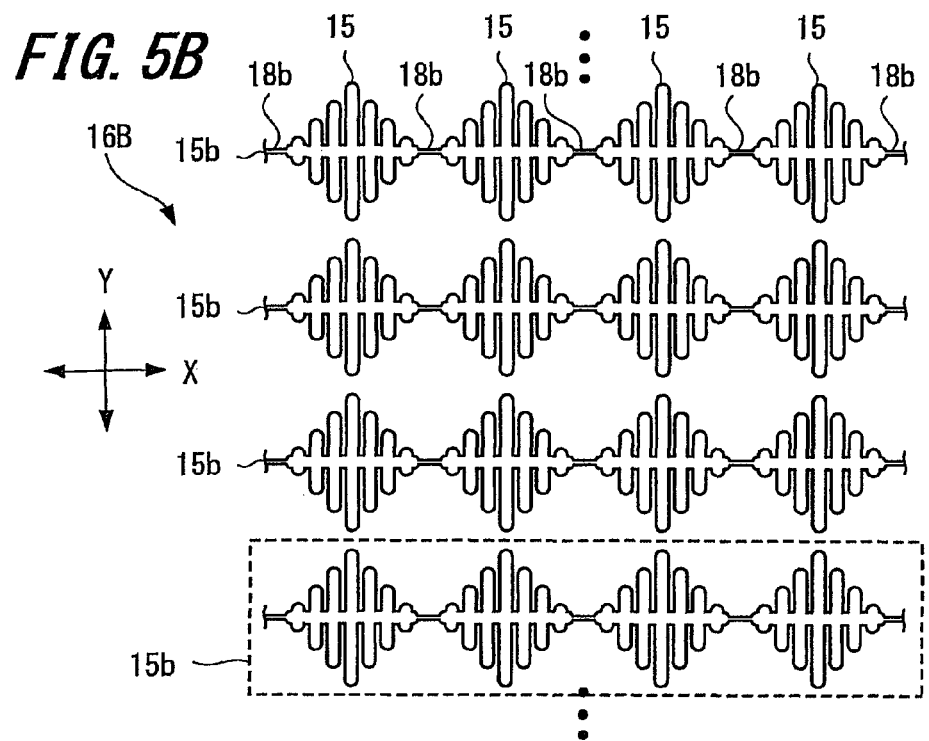

As shown in FIG. 4, the detection area 16 is formed such that the gaps between the detection electrodes 15 of the first detection electrode groups 16A as seen in FIG. 5A, and the gaps between the detection electrodes 15 of the second detection electrode group 16B as seen in FIG. 5B, are respectively filled by the second detection electrode group 16B and the first detection electrode group 16A. Since the gaps between the detection electrodes 15 of the first detection electrode groups 16A and the gaps between the detection electrodes 15 of the second detection electrode group 16B are filled, when the human body part approaches the first detection section 13, the human body part faces the detection electrodes 15 of both the first and second detection electrode groups 16A, 16B.

Figure 6:
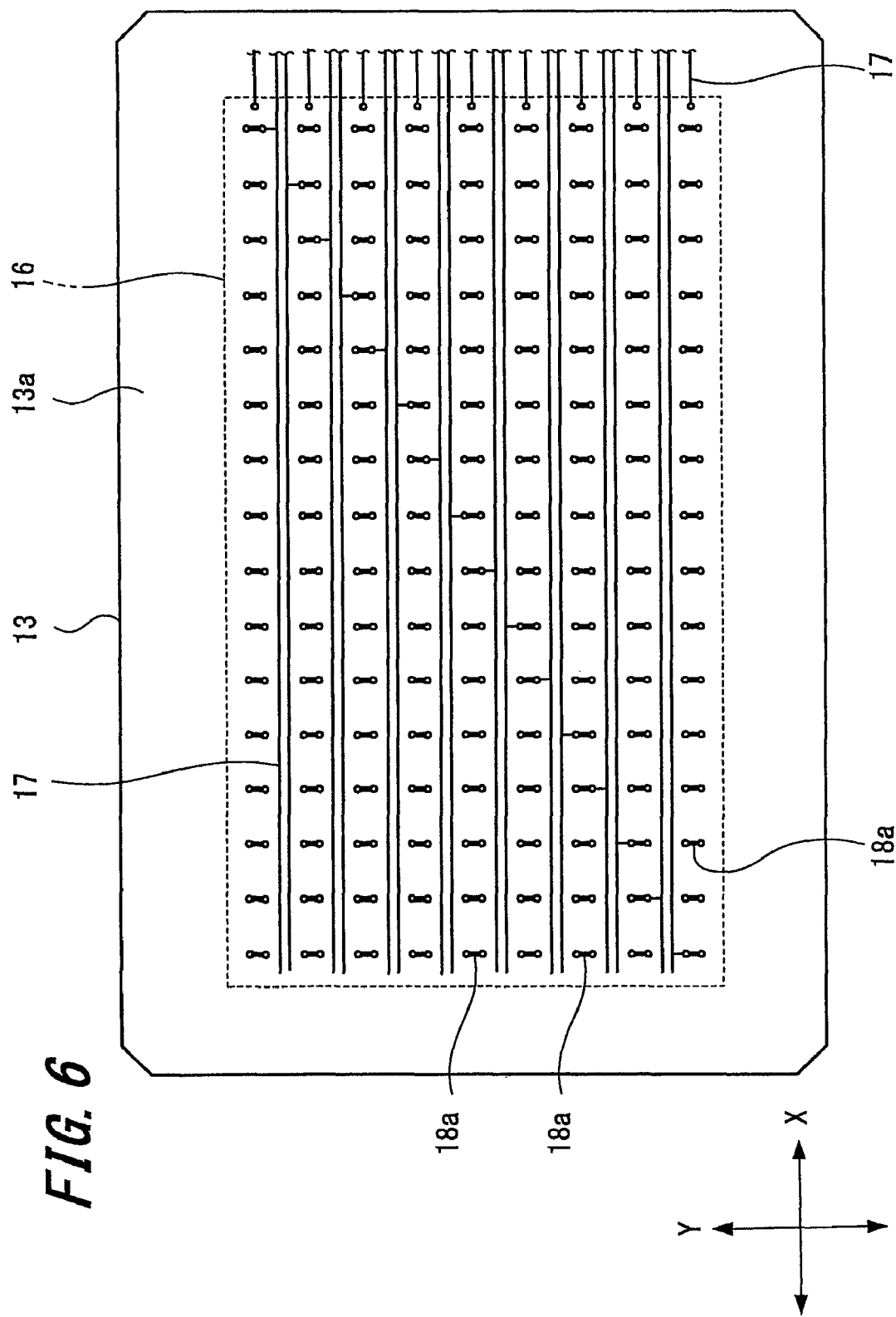
FIG. 6 is a plan view showing the first detection section of the position detecting device according to the aforesaid embodiment when seen from the other face of the first detection section.

Further, as shown in FIG. 6, the connecting portions 18a of the first detection electrode arrays 15a as seen in FIG. 5A, connect the adjacent detection electrodes 15 on the other surface (referred to as the "rear surface" hereinafter) side of the first detection section 13. In contrast, the connecting portion 18b of the second detection electrode arrays 15b as seen in FIG. 5B, connect the adjacent detection electrodes 15 on the front surface side of the first detection section 13. As a result, when the first and second detection electrode groups 16A and 16B are installed as shown in FIG. 4, the connecting portions 18a of the first detection electrode group 16A and the connecting portions 18b of the second detection electrode group 16B are prevented from contacting each other.

As shown in FIG. 6, a plurality of lead wires 17 are provided on the rear surface of the first detection section 13. The first detection electrode group 16A and the second detection electrode group 16B are connected to the capacitance measuring circuit 22 through the lead wires 17.

Regarding the size of the detection electrodes 15 configuring the detection area 16, it is preferred that the size of each of the detection electrodes 15 is set so that when the human body part approaches or contacts with the input section 4, the human body part faces at least two detection electrodes 15 of the first detection electrode group 16A and two detection electrodes 15 of the second detection electrode group 16B. Thus, since the human body part faces at least two detection electrodes 15 in both the X-axis direction and Y-axis direction, the position where the human body part approaches or contacts with the input section 4 can be detected more precisely based on a capacitance difference between the two detection electrodes 15.

Figure 7:
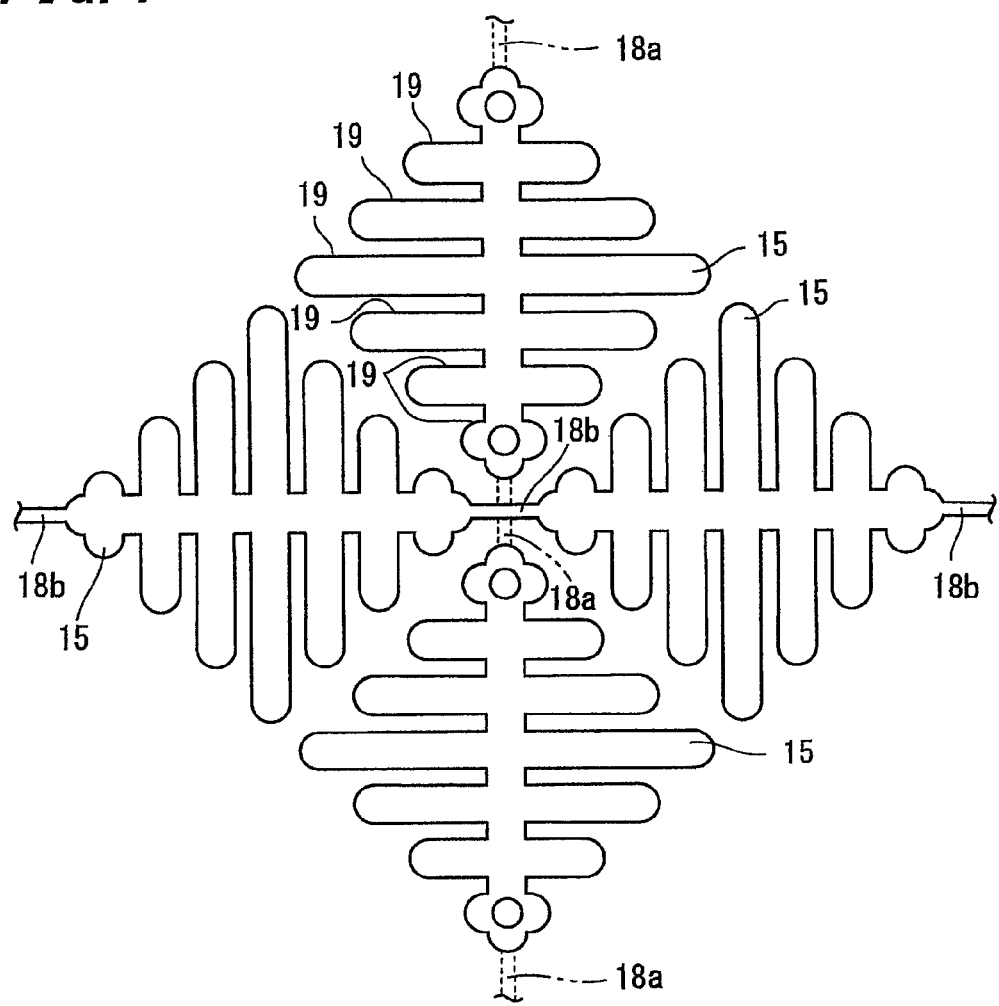
FIG. 7 is an enlarged plan view showing a primary portion of the first detection section of the position detecting device according to the aforesaid embodiment.

Next, the shape of the detection electrode 15 will be described below with reference to FIG. 7. The detection electrode 15 may be formed in a substantially quadrangular shape (the detection electrode 15 arranged in the outer peripheral portion of the detection area 16 may be formed in a substantially triangular shape), and may be formed with a plurality of slits 19. The plurality of slits 19 are arranged in parallel with each other at substantially equal intervals. Further, the plurality of slits 19 are arranged in line-symmetry by using a line connecting two vertexes (to which the connecting portions 18a and 18b are connected) as a symmetry axis, so that six slits 19, for example, are formed on each side. Further, each of the slits 19 extends from the outer edge to the inner side of the detection electrode 15, and is open at the outer edge of the detection electrode 15 and closed at the inner side of the detection electrode 15. As a result, the detection electrode 15 as a whole has a comb shape. The slits 19 may be formed by etching the detection electrode 15.

Further, in the detection electrode 15, the length of the diagonal connecting two opposite vertexes is set to, for example, 5 mm, and the width of each of the slits 19 is set to, for example, 0.1 mm. Thus, the opening area of the slit 19 is small enough compared to the area of the detection electrode 15. Thus, the area of the detection electrode 15 having slits 19 is almost equal to the area of a conventional detection electrode having no slit. Thus, the detection accuracy of the first detection section 13, such as an electrostatic capacity type detection section, according to the present embodiment is almost the same as that of a conventional detection electrode having no slit.

Although the present embodiment is described using an example in which the detection electrode 15 is formed in a substantially quadrangular shape, the present invention is not limited thereto. For example, the detection electrode can be formed in a hexagonal shape or a circular shape. Here, if the detection electrode is formed in a hexagonal shape, it is preferred that a plurality of detection electrodes are arranged in a honeycomb shape. Further, although six slits 19 are formed on each side of the symmetry axis in the present embodiment, the number of the slits 19 formed on each side of the symmetry axis may be five, seven, less than five, or more than seven. Further, although the slits 19 are formed by etching in the present embodiment, the method for forming the slits 19 is not limited to etching. For example, when forming the detection electrode 15, the slits 19 may be formed by printing a silver paste, or the like, on the substrate 13a using an ink jet printer.

Next, the operation of the first detection section 13 will be described below with reference to FIG. 2. A predetermined voltage from the capacitance measuring circuit 22 is applied to the plurality of detection electrodes 15 forming the first detection section 13. Further, when the human body part approaches or contacts with the input section 4, the capacitance between the human body part and the detection electrode 15 being approached will change since the human body part is considered a grounding body. The capacitance measuring circuit 22 identifies the detection electrodes 15 whose capacitance changes, and executes an arithmetic processing based on the position and capacitance change of the identified detection electrode 15 and the like to detect the position where the human body part approaches or contacts with the input section 4.

Figure 8:
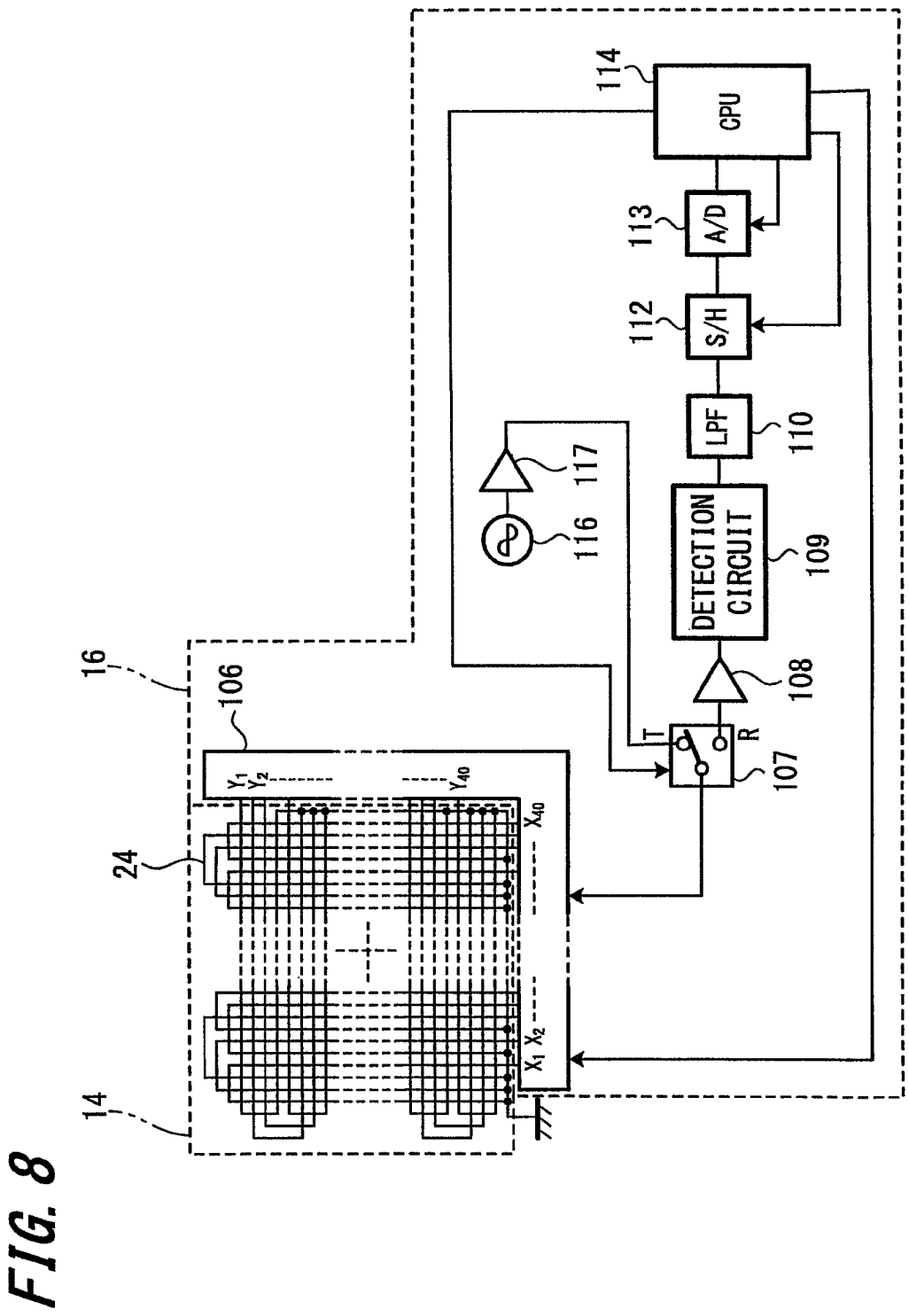
FIG. 8 is a block diagram explaining the configuration and operation of a second detection section according to the aforesaid embodiment.

Next, the configuration and operation of the second detection section 14 and the electromagnetic induction detection circuit 23 will be described below with reference to FIG. 8. The second detection section 14 is provided with a plurality of loop coils 24 on its surface opposing the rear surface of the first detection section 13, and the plurality of loop coils 24 are connected to the electromagnetic induction detection circuit 23.

The second detection section 14 has forty loop coils $24X_1$-$24X_{40}$ arranged in the X-axis direction, and forty loop coils $24Y_1$-$24Y_{40}$ arranged in the Y-axis direction. The loop coils $24X_1$-$24X_{40}$ and loop coils $24Y_1$-$24Y_{40}$ are connected to a selecting circuit 106 of the electromagnetic induction detection circuit 23, the selecting circuit 106 being adapted to select each of the loop coils 24. Although the number of loop coils 24 is forty in each direction in the present embodiment, the number of loop coils 24 is not limited to forty.

The electromagnetic induction detection circuit 23 includes the selecting circuit 106, a transmission/reception switching circuit 107, an amplifier 108, a detection circuit 109, a low-pass filter (LPF) 110, and a sample-and-hold circuit 112. The selecting circuit 106 is connected to the transmission/reception switching circuit 107, and the amplifier 108 is connected to a reception side of the transmission/reception switching circuit 107. The amplifier 108 is connected to the detection circuit 109, and the detection circuit 109 is connected to the sample-and-hold circuit 112 through the low-pass filter (LPF) 110. Further, the sample-and-hold circuit 112 is connected to an A/D conversion circuit (analog-digital conversion circuit) 113, and the A/D conversion circuit 113 is connected to a CPU (central processing unit) 114. The CPU 114 supplies control signals to the selecting circuit 106, the sample-and-hold circuit 112, the A/D conversion circuit 113 and the transmission/reception switching circuit 107.

Further, the electromagnetic induction detection circuit 23 is provided with an oscillator 116 for generating an AC signal having a frequency $f_0$ and a current driver 117 for converting the AC signal to a current, the current driver 117 being connected to a transmission side of the transmission/reception switching circuit 107. When the contact point of the transmission/reception switching circuit 107 is switched to the transmission side in response to the control signal supplied from the CPU 114, a magnetic field is generated by the loop coils $24X_1$-$24X_{40}$ and loop coils $24Y_1$-$24Y_{40}$ of the second detection section 14.

When the position indicator 2 approaches the input section 4, the resonant circuit incorporated into the position indicator 2 will resonate so as to generate an induced voltage. Then, in the second detection section 14 of the input section 4, when the contact point of the transmission/reception switching circuit 107 is switched to the reception side in response to the control signal supplied from the CPU 114, the supply of the magnetic field to the position indicator 2 is stopped. Thus, due to the induced voltage previously generated during reception time, a magnetic field is generated by the coil incorporated in the position indicator 2. The second detection section 14 detects the position of the position indicator 2 by detecting the magnetic field generated by the coil incorporated in the position indicator 2.

With the position detecting device 1 having the above-mentioned configuration, input operation can be performed using both the electrostatic capacity method and the electromagnetic induction method, and operability can be improved. Incidentally, when a user performs input operation with the position indicator 2, there is a concern that the user's hand holding the position indicator 2 might touch the input section 4. One solution in accordance with an embodiment is to configure the device in such a manner that when the position indicator 2 and the human body part approach or contact the input section 4 simultaneously, the position of the position indicator 2 is preferentially detected, for example.

Further, the switching of the detection method of the input section 4 is not limited to the above-mentioned manner. For example, a change-over switch may be provided to allow the user to optionally switch the detection method of the input section 4 between the first detection section 13 and the second detection section 14. Further, the detection method may also be switched between the first detection section 13 and the second detection section 14 for each area where the position indicator 2 or the human body part approaches or contacts the input section 4.

Figure 9:
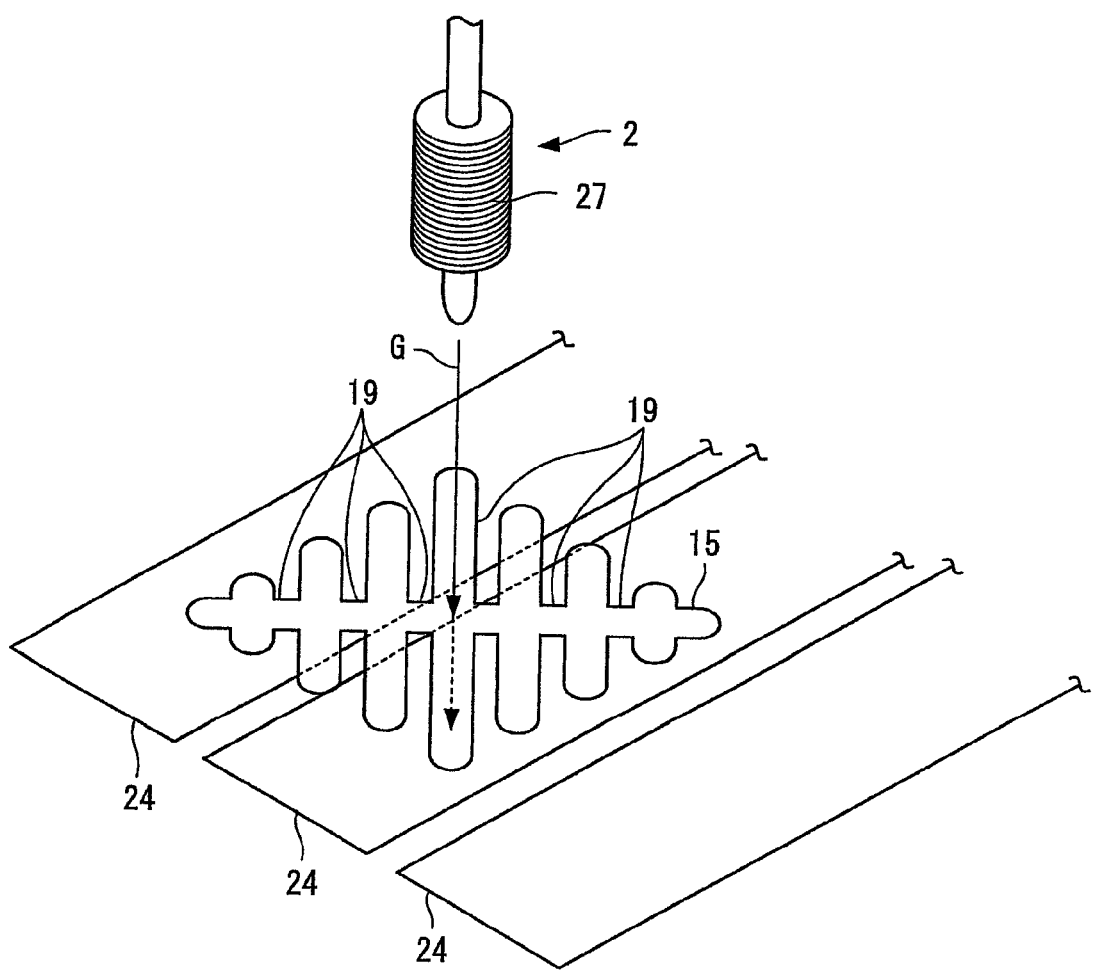
FIG. 9 is a view schematically showing a state where a detection electrode is superimposed on loop coils of the second detection section according to the aforesaid embodiment.

Next, a state when the position of the position indicator 2 is being detected by the second detection section 14 will be described below with reference to FIG. 9.

When the position indicator 2 approaches the loop coils 24 configuring the second detection section 14, as described above, the resonant circuit incorporated into the position indicator 2 will resonate so as to generate the induced voltage. When the contact point of the transmission/reception switching circuit 107 shown in FIG. 8 is switched to the reception side, the supply of the magnetic field to the position indicator 2 is stopped. As a result, due to the induced voltage previously generated during reception time, the magnetic field is generated by a coil 27 incorporated in the position indicator 2.

The detection electrode 15 is interposed between the loop coils 24 and the position indicator 2. Thus, when the coil 27 incorporated in the position indicator 2 generates a magnetic flux G, an eddy current is generated on the surface of the detection electrode 15, the eddy current having such a direction so as to suppress the magnetic flux G generated by the coil 27.

However, as described above, the detection electrode 15 is provided with a plurality of slits 19 formed at substantially equal intervals. The plurality of slits 19 are formed by cutting out (or selectively removing) the detection electrode 15 from the outer edge to the inner side. Since the detection electrode 15 is partially divided into plural parts by the plurality of slits 19, a strong eddy current will not be generated. Thus, by minimizing the eddy current generated in the detection electrode 15, the magnetic flux caused by the eddy current (which suppresses the magnetic flux G) can also be prevented from being generated. As a result, attenuation of the magnetic flux G from the position indicator 2 can be prevented or suppressed.

Although the above description is directed to the magnetic flux from the coil 27 configuring the resonant circuit of the position indicator 2, the attenuation of a magnetic flux output from the loop coils 24 provided in the second detection section 14 to the coil 27 of the position indicator 2 can be prevented or suppressed in the same manner. Accordingly, since attenuation of the magnetic flux from the position indicator 2 and the magnetic flux from the loop coils 24 caused by the detection electrode 15 can be both prevented or suppressed, degradation of the induced electromotive force in the position indicator 2 can be prevented or suppressed.

Next, detection electrodes according to other embodiments will be described below with reference to FIGS. 10 and 11.

Figure 10:
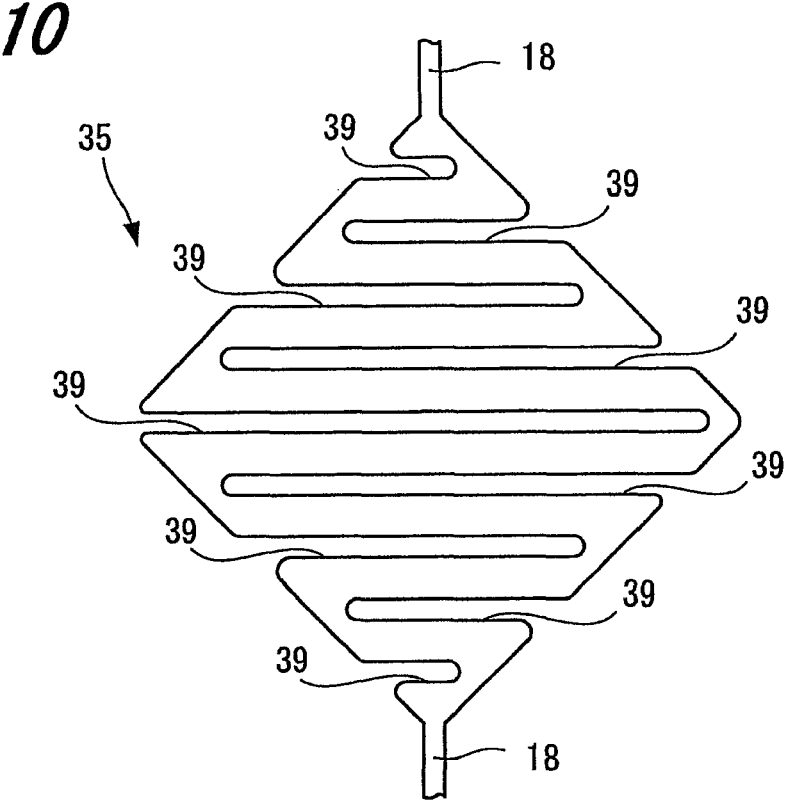
FIG. 10 is a plan view showing a detection electrode of a position detecting device according to another embodiment of the present invention.

FIG. 10 is a plan view showing a detection electrode 35 of a position detecting device according to another embodiment of the present invention. In the detection electrode 35, directions of open ends of slits 39 are alternately reversed as going from one vertex to the other vertex (to which the connecting portions 18 are connected).

Figure 11:
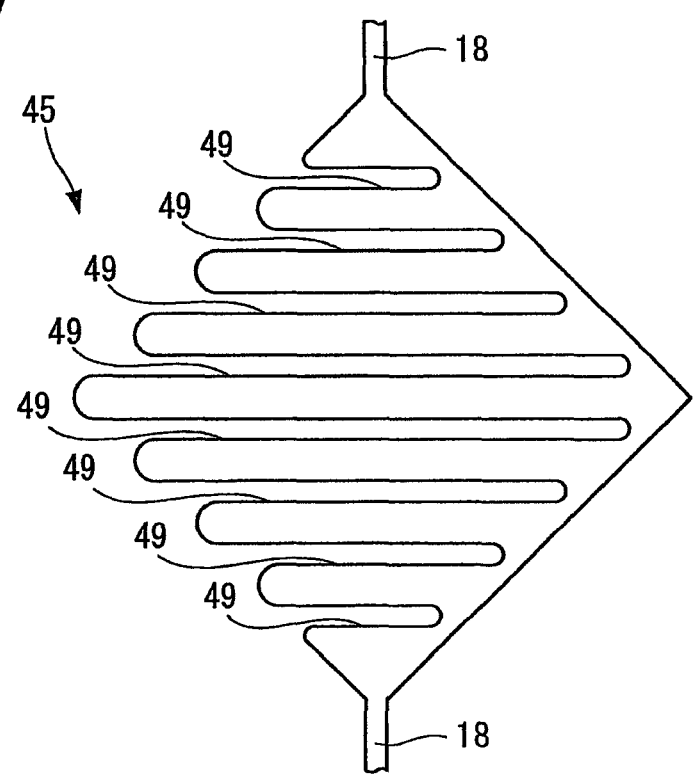
FIG. 11 is a plan view showing a detection electrode of a position detecting device according to a further embodiment of the present invention.
Figure 12:
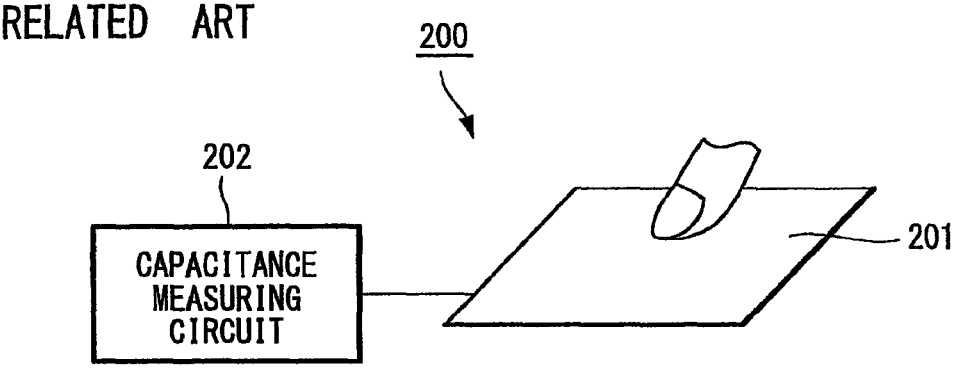
FIG. 12 is a view schematically showing an electrostatic capacity type detection section according to a related art (prior art)
Figure 13:
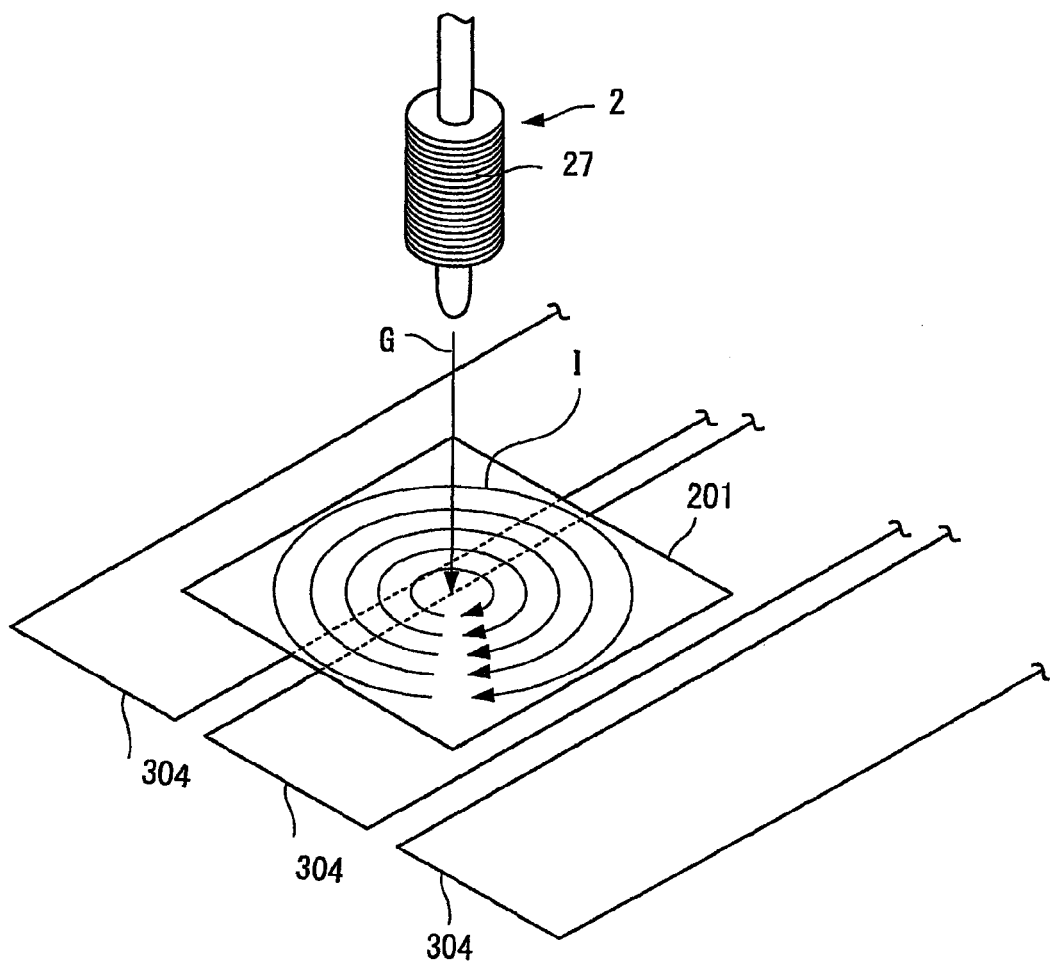
FIG. 13 is a view schematically showing a position detecting device according to a related art in which a first detection section (an electrostatic capacity type detection section) and a second detection section (an electromagnetic induction type detection section) are superimposed on each other.

FIG. 11 is a plan view showing a detection electrode 45 of a position detecting device according to yet another embodiment of the present invention. In the detection electrode 45, each of the slits 49 extends from one side to the other side with respect to a line connecting two vertexes (to which the connecting portions 18 are connected), and is open at the outer edge of the one side and closed at the other side. With the detection electrodes 35 and 45, the same advantages as the detection electrode 15 can also be achieved.

It is to be understood that the present invention is not limited to the embodiments described above and illustrated in the attached drawings. Various modifications can be made without departing from the spirit and scope of the present invention described in the claims. For example, although the housing and the input section are each formed in a quadrangular shape in the aforesaid embodiments, obviously the housing and the input section may also be formed in other shapes, such as a circular shape, a triangular shape, a hexagonal shape, an octagon shape, and the like. Further, although the slits are formed in a straight line shape with respect to the detection electrode in the aforesaid embodiments, the slits may also be formed in a corrugated (serpentine) or curved shape.

What is claimed is:
1. A position detecting device comprising:
an input section including a capacitive touch sensor pattern and an electromagnetic resonance (EMR) sensor pattern overlaid with each other, the EMR sensor pattern including one or more coils configured to electromagnetically couple with a resonant circuit included in an EMR position indicator to detect a position indicated by the EMR position indicator on or above the EMR sensor pattern;
wherein the capacitive touch sensor pattern includes electrodes configured to capacitively couple with a capacitive position indicator; and
wherein at least some of the electrodes are each provided with one or more slits, each slit has an open end and a closed end, and all of the slit(s) provided in each electrode extend toward an outer edge of said electrode to have their open end(s) exposed, so as to pass through electromagnetic flux associated with the EMR sensor pattern to thereby reduce generation of eddy current in the capacitive touch sensor pattern due to the electromagnetic flux.

2. The position detecting device of claim 1, wherein at least some of the electrodes provided with one or more slits have a generally quadrangular shape, and each slit extends from its closed end proximate to a diagonal line of the generally quadrangular shape toward an outer edge of the generally quadrangular shape to have its open end exposed.

3. The position detecting device of claim 1, wherein at least some of the electrodes are each provided with two or more slits, and directions of open ends of the two or more slits are alternately reversed in each of the electrodes provided with two or more slits.

4. The position detecting device of claim 1, wherein at least some of the electrodes are each provided with two or more slits, and directions of open ends of the two or more slits are the same in each of the electrodes provided with two or more slits.

5. A position detecting device comprising:
an input section including a capacitive touch sensor pattern and an electromagnetic resonance (EMR) sensor pattern overlaid with each other, the EMR sensor pattern including one or more coils configured to electromagnetically couple with a resonant circuit included in an EMR position indicator to detect a position indicated by the EMR position indicator on or above the EMR sensor pattern;
wherein the capacitive touch sensor pattern includes electrodes configured to capacitively couple with a capacitive position indicator, the electrodes including a first electrode group in which first electrodes are electrically connected with each other in a first direction and are arranged in one or more rows that are separated from each other in a second direction that crosses the first direction, and a second electrode group in which second electrodes are electrically connected with each other in the second direction and are arranged in one or more rows that are separated from each other in the first direction; and
wherein at least some of the first electrodes are each provided with one or more slits that extend in the second direction and at least some of the second electrodes are each provided with one or more slits that extend in the first direction, to pass through electromagnetic flux associated with the EMR sensor pattern to thereby reduce generation of eddy current in the capacitive touch sensor pattern due to the electromagnetic flux.

6. The position detecting device of claim 5, wherein at least some of the first and second electrodes provided with one or more slits have a generally quadrangular shape, each slit has an open end and a closed end, and each slit extends from its closed end proximate to a diagonal line of the generally quadrangular shape toward an outer edge of the generally quadrangular shape to have its open end exposed.

7. The position detecting device of claim 5, wherein at least some of the first and second electrodes are each provided with two or more slits, each slit has an open end and a closed end, and directions of open ends of the two or more slits are alternately reversed in each of the first and second electrodes provided with two or more slits.

8. The position detecting device of claim 5, wherein at least some of the first and second electrodes are each provided with two or more slits, each slit has an open end and a closed end, and directions of open ends of the two or more slits are the same in each of the first and second electrodes provided with two or more slits.

9. A position detecting device comprising:
an input section including a capacitive touch sensor pattern and an electromagnetic resonance (EMR) sensor pattern overlaid with each other, the EMR sensor pattern including one or more coils configured to electromagnetically couple with a resonant circuit included in an EMR position indicator to detect a position indicated by the EMR position indicator on or above the EMR sensor pattern;
wherein the capacitive touch sensor pattern includes electrodes configured to capacitively couple with a capacitive position indicator, the electrodes including a first electrode group in which first electrodes are electrically connected with each other in a first direction and are arranged in one or more rows that are separated from each other in a second direction that crosses the first direction, and a second electrode group in which second electrodes are electrically connected with each other in the second direction and are arranged in one or more rows that are separated from each other in the first direction; and
wherein at least some of the first electrodes are each provided with one or more slits that extend in the first direction and at least some of the second electrodes are each provided with one or more slits that extend in the second direction, to pass through electromagnetic flux associated with the EMR sensor pattern to thereby reduce generation of eddy current in the capacitive touch sensor pattern due to the electromagnetic flux.

10. A capacitive touch sensor pattern for use with an electromagnetic resonance (EMR) sensor pattern to be overlaid with each other, the EMR sensor pattern including one or more coils configured to electromagnetically couple with a resonant circuit included in an EMR position indicator to detect a position indicated by the EMR position indicator on or above the EMR sensor pattern, the capacitive touch sensor pattern comprising:
electrodes configured to capacitively couple with a capacitive position indicator;
wherein at least some of the electrodes are each provided with one or more slits, each slit has an open end and a closed end, and all of the slit(s) provided in each electrode extend toward an outer edge of said electrode to have their open end(s) exposed, so as to pass through electromagnetic flux associated with the EMR sensor pattern to thereby reduce generation of eddy current in the capacitive touch sensor pattern due to the electromagnetic flux.

11. The capacitive touch sensor pattern of claim 10, wherein at least some of the electrodes provided with one or more slits have a generally quadrangular shape, and each slit extends from its closed end proximate to a diagonal line of the generally quadrangular shape toward an outer edge of the generally quadrangular shape to have its open end exposed.

12. The capacitive touch sensor pattern of claim 10, wherein at least some of the electrodes are each provided with two or more slits, and directions of open ends of the two or more slits are alternately reversed in each of the electrodes provided with two or more slits.

13. The capacitive touch sensor pattern of claim 10, wherein at least some of the electrodes are each provided with two or more slits, and directions of open ends of the two or more slits are the same in each of the electrodes provided with two or more slits.

14. The capacitive touch sensor pattern of claim 10, wherein the one or more slits has a linear shape.

15. The capacitive touch sensor pattern of claim 10, wherein the one or more slits has curvature.

* * * * *